(No Model.)

A. D. JENKINS.
BICYCLE.

No. 490,252. Patented Jan. 17, 1893.

WITNESSES:
H. Walker
C. Sedgwick

INVENTOR
A. D. Jenkins
BY
Munn & Co
ATTORNEYS.

UNITED STATES PATENT OFFICE.

ANTHONY D. JENKINS, OF PHILADELPHIA, PENNSYLVANIA.

BICYCLE.

SPECIFICATION forming part of Letters Patent No. 490,252, dated January 17, 1893.

Application filed May 11, 1892. Serial No. 432,622. (No model.)

*To all whom it may concern:*

Be it known that I, ANTHONY D. JENKINS, of Germantown, in the city and county of Philadelphia, and State of Pennsylvania, have invented an Improvement in Bicycles, of which the following is a full, clear, and exact description.

My invention relates to improvements in bicycles; and the object of my invention is to produce a simple form of bicycle which is provided with a system of differential gears which enables it to be run very easily at an ordinary rate of speed, and by means of which also it may be run slowly and with great power, or very rapidly as desired.

To this end my invention consists in certain features of construction and combinations of the same, as will be fully described hereinafter and then pointed out in the claims.
Reference is to be had to the accompanying drawings forming a part of this specification, in which similar figures of reference indicate corresponding parts in both the views.

Figure 1:
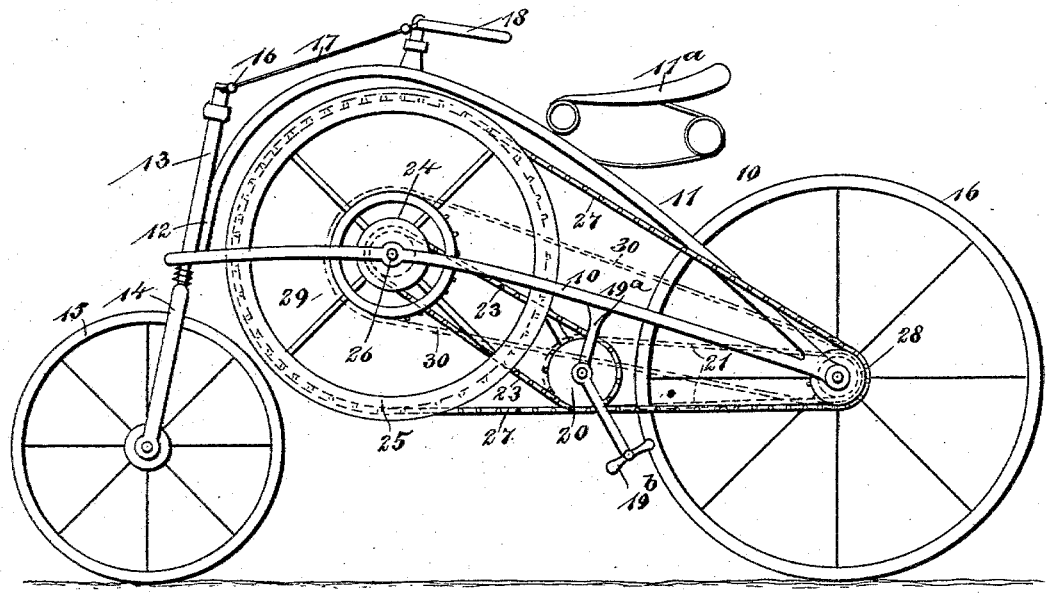
Figure 2:
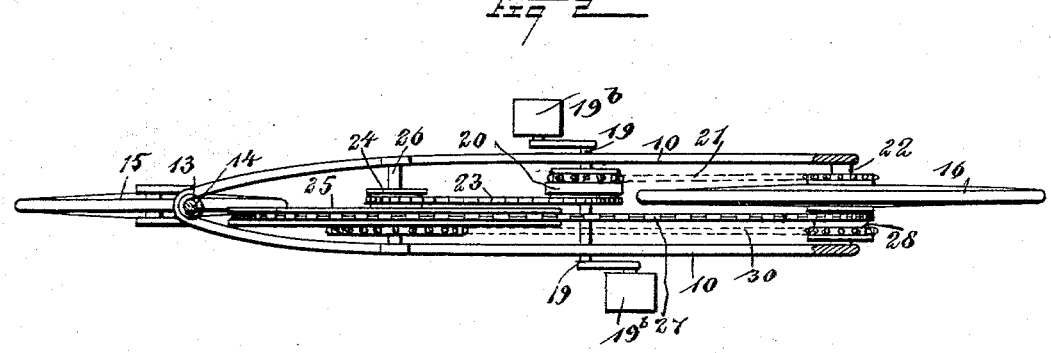

Figure 1 is a side elevation of the bicycle embodying my invention; and Fig. 2 is a sectional plan of the same.

The bicycle is of the "safety" type and is provided with a main frame 10 of an elongated U-shape, the frame having an upwardly curved backbone 11 extending from front to rear, and the backbone is secured at its front, as shown at 12, to the sleeve 13 in which the steering fork 14 turns, this fork being journaled on the axle of the forward wheel 15 in the usual way. The upper end of the steering fork terminates in a cross bar 16 which connects by rods 17 with the handle bar 18, this being journaled in a suitable support on the top front portion of the backbone. Behind the handle bar is a common form of saddle 11ª.

The machine is provided with the ordinary driving axle 19 which is journaled in hangers 19ª which depend from opposite sides of the frame 10, and the cranks of the axle are provided with the usual pedals 19ᵇ. The axle is provided with a double sprocket wheel 20, of comparatively small diameter, and this sprocket wheel carries a chain 21 shown in dotted lines which extends backward and turns over a small sprocket wheel 22 on the hub of the rear wheel 16. A chain 23 extends forward from the sprocket wheel 20 and drives a small sprocket wheel 24 which is formed on the hub of the main fly wheel 25, the latter being journaled on a shaft 26 which is held in the frame 10 parallel with and in advance of the driving axle 19. The fly wheel 25 is also a sprocket wheel and it is provided with a driving belt 27 which connects with a small sprocket wheel 28 on the hub of the rear wheel 16. On the main sprocket wheel or fly wheel is also produced a sprocket wheel 29 of a size intermediate of the sizes of the wheels 20 and 25, and this sprocket wheel 29 drives a chain 30 shown in dotted lines which also connects with the sprocket wheel 28.

In the drawings the bicycle is propelled by chains 23 and 27, but the chain 27 may be detached and the chain 30 used in its stead, or the chain 30 may be detached and the chain 21 used to drive the bicycle according to the nature of the country over which the bicycle is propelled, as described below.

If the machine is to be driven slowly and with great power, for instance, when traveling over very hilly roads, all the chains, with the exception of the chain 21, may be dispensed with. If the machine is to be driven at a moderate rate of speed, the chains 21 and 27 are dispensed with and the power is transmitted to the rear wheel through the sprocket wheel 20, the chain 23, the sprocket wheels 24 and 29, and the chain 30. If the machine is to be driven at great speed, the chains 21 and 30 are dispensed with and the power is transmitted to the rear wheel through the sprocket wheel 20, the chain 23, the sprocket wheels 24 and 25, and the chain 27. In either case the main sprocket wheel 25 will serve as a fly wheel and assist in keeping up a constant and steady motion.

It will be seen that the construction of the main frame enables the fly wheel to be carried without difficulty, and the machine may be easily mounted, steered, and propelled.

Having thus described my invention, I claim as new, and desire to secure by Letters Patent:—

1. A bicycle, comprising a frame having wheels at each end, a driving axle journaled in the frame and having a sprocket wheel and chain connection with the rear wheel, and a differential sprocket wheel journaled in the frame in advance of the driving axle, the said differential sprocket wheel being operatively connected with the driving axle and with the rear bicycle wheel, substantially as described.

2. The combination with the bicycle having a U-shaped frame extending nearly horizontally and provided with an upwardly curved backbone which carries the seat, of the driving axle journaled in the main frame and having a sprocket wheel and chain connection with the rear bicycle wheel, a differential sprocket wheel journaled in the main frame in advance of the driving axle, a chain connection between the differential sprocket wheel and the driving gear and chain connections between the differential sprocket wheel and a sprocket wheel on the hub of the rear bicycle wheel, substantially as described.

3. The combination with the bicycle, of the driving axle journaled in the bicycle frame and having a sprocket wheel and chain connection with the rear bicycle wheel, a sprocket fly wheel journaled in the main frame in advance of the driving axle, said fly wheel consisting of connected sprocket wheels of different sizes, and a chain connection between the sprocket fly wheel and the driving axle and between the fly wheel and the rear bicycle wheel, substantially as described.

ANTHONY D. JENKINS.

Witnesses:
JAMES F. COURTNEY,
CHARLES E. COADY.